United States Patent [19]

Gorbaty

[11] 4,057,681

[45] Nov. 8, 1977

[54] PROCESS FOR HOMOGENEOUSLY POLYMERIZED HIGH UNSATURATION C4–C10 ISOOLEFIN CONJUGATED DIENE COPOLYMERS

[75] Inventor: Martin L. Gorbaty, Fanwood, N.J.

[73] Assignee: Exxon Research & Engineering Co., Linden, N.J.

[21] Appl. No.: 681,326

[22] Filed: Apr. 28, 1976

Related U.S. Application Data

[63] Continuation-in-part of Ser. No. 584,456, June 6, 1975, abandoned.

[51] Int. Cl.$^2$ .......................... C08F 2/06; C08F 4/14; C08F 4/52
[52] U.S. Cl. .............................. 526/185; 260/45.9 R; 260/45.95 R; 260/45.85 P; 526/237; 526/308
[58] Field of Search ........................ 526/185, 237, 308

[56] References Cited

U.S. PATENT DOCUMENTS 3,808,177  4/1974  Thaler et al. .................. 260/80.7
3,856,763  12/1974  Thaler et al. .................. 260/80.7

Primary Examiner—Stanford M. Levin
Attorney, Agent, or Firm—H. E. Naylor

[57] ABSTRACT

A homogeneous polymerization process for preparing high unsaturation, high number average molecular weight polymers of isoolefins and conjugated multiolefins, particularly cyclic conjugated multiolefins, by use of a blend of at least one solvent selected from the $C_4$–$C_8$ acyclic paraffins such as hexane with at least one solvent selected from the $C_5$–$C_8$ cycloparaffins such as cyclohexane.

51 Claims, 1 Drawing Figure

EFFECT OF INCREASING COSOLVENT LEVEL ON $\bar{M}_n$ OF ISOBUTYLENE-CYCLOPENTADIENE COPOLYMERS (-120° C)

PROCESS FOR HOMOGENEOUSLY POLYMERIZED HIGH UNSATURATION C4–C10 ISOOLEFIN CONJUGATED DIENE COPOLYMERS

CROSS REFERENCE TO RELATED APPLICATIONS

This is a continuation-in-part of U.S. Ser. No. 584,456, filed June 6, 1975, now abandoned.

BACKGROUND OF THE INVENTION

Isoolefin-conjugated diene copolymers have been known in the art for some time. Commercially these products are termed butyl rubbers. Although earlier disclosures talk of unsaturation ranges of 0.5 to 15%, commercial products were limited to the 0.5 to 4% unsaturation range. The higher unsaturation products were either low in molecular weight or resinous due to crosslinking.

More recently high number average molecular weight, high unsaturation gel-free polymers of isoolefins and conjugated dienes have been prepared by Thaler et al.; see, for example, U.S. Pat. No. 3,808.177 and U.S. application Ser. No. 348,678, now U.S. Pat. No. 3,856,763, both incorporated herein by reference. The novel aspects of the process for producing these unique polymers are (1) carrying out the reaction in a homogeneous phase; (2) using particular Friedel-Crafts catalyst systems; (3) at polymerization temperatures below −100° C; and (4) using a minimum amount of nonreactive diluent.

The diluent, which is termed a cosolvent since it, together with the monomers, make up the reaction medium solvent, is used in amounts of about 5 to about 40 volume percent of cosolvent based on the cosolvent plus total monomers. Thaler et al have found that in certain instances the preferred solvents for carrying out their polymerization are methylcyclohexane and carbon disulfide.

The use of carbon disulfide can be disadvantageous in view of its toxicity and flammability. On the other hand, methylcyclohexane is a high cost solvent. Methylcyclohexane also has a normal boiling point above 100° C, making it somewhat difficult to steam strip in the polymer recovery stage.

Hence, there is need for a solvent which is useful in carrying out the polymerization process which is effective as well as low in cost, toxicity and handling hazards. The cosolvent mixtures of the instant invention have a boiling point less than 100° C, thus allowing said cosolvent to be easily steam stripped in the polymer recovery step.

SUMMARY OF THE INVENTION

It has surprisingly been found that high unsaturation, high number average molecular weight polymers of isoolefins and conjugated multiolefins, particularly cyclic conjugated multiolefins, may be prepared in a homogeneous phase by blending at least one poor solvent selected from the $C_4$–$C_8$ acyclic paraffins with a better solvent selected from the $C_5$–$C_8$ cycloparaffins wherein the amount of $C_5$–$C_8$ cycloparaffin is present in about 15 to about 90 volume % based on the total volume of solvent. Homogeneous polymerizations give more latitude from the standpoint of variation of polymerization temperature and feed composition, i.e. ratio of isoolefin to cyclopentadiene.

FIG. I illustrates the effect of increasing cosolvent level on number average molecular weight.

DETAILED DESCRIPTION

Figure 1:
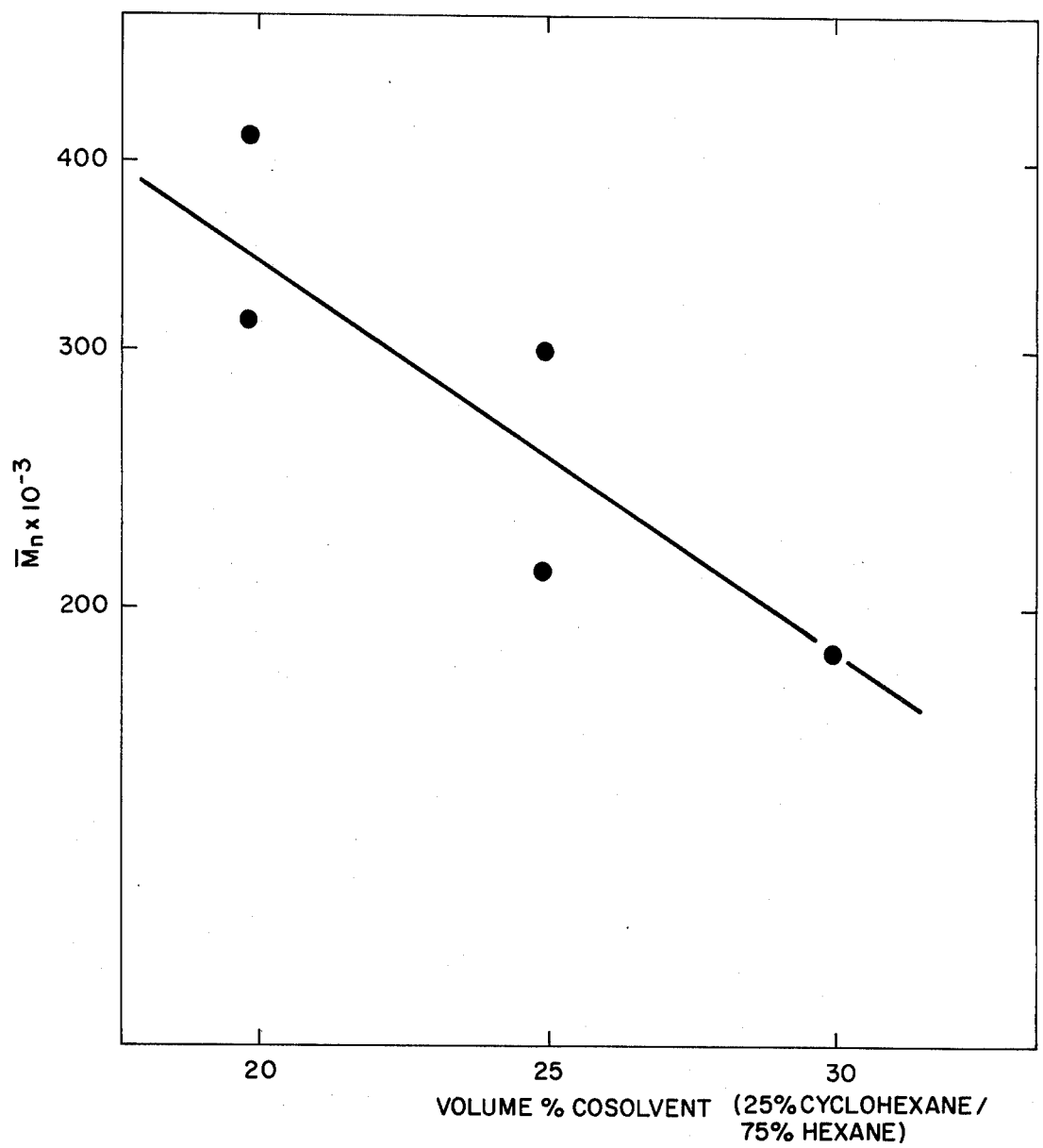

This invention relates to an improved process for preparing high unsaturation, high number average molecular weight, substantially gel free copolymers of isoolefins and conjugated multiolefins. More particularly, this invention relates to an improved process wherein the multiolefin is a cyclic conjugated multiolefin. The novel aspect of this invention is the solvent system used as the cosolvent for the polymerization reaction. The cosolvent of the instant invention is a blend of $C_5$–$C_8$ cycloparaffins and $C_4$–$C_8$ acyclic paraffins. In one preferred embodiment, the cosolvent is a blend of commercial hexane and cyclohexane.

The isoolefins suitable for use in the instant invention are the $C_4$–$C_{10}$ isoolefins. Illustrative non-limiting examples of these isoolefins are isobutylene, 2-methyl-1-butene, 3-methyl-1-butene, 2-methyl-1-pentene, 4-methyl-1-pentene, beta-pinene, etc. The isoolefin of choice is isobutylene.

In the practice of this invention, any conjugated multiolefin may be used as the co-monomer. Preferably, the conjugated multiolefin is a $C_5$ to $C_{14}$ multiolefin. More preferably, the multiolefin is a cyclic conjugated diolefin of about 5 to about 9 carbon atoms. Illustrative non-limiting examples of cyclic conjugated multiolefins suitable for use in the instant invention are cyclopentadiene, methyl cyclopentadiene, dimethyl cyclopentadiene, trimethyl cyclopentadiene, fulvene, dimethyl fulvene, cyclohexadiene, and dimethyl cyclohexadiene. Preferred are cyclopentadiene, methyl cyclopentadiene, cyclohexadiene and fulvene. Most preferred is cyclopentadiene.

Of course, those skilled in the art will recognize that the copolymers of this invention may be copolymers of an isoolefin with more than one multiolefin. A preferred copolymer comprising more than one multiolefin is an isobutylene/isoprene/a $C_5$–$C_9$ cyclic conjugated multiolefin terpolymer. More preferred is an isobutylene/isoprene/cyclopentadiene terpolymer. Hence, the preferred polymers of this invention are polymers produced by the copolymerization of an isoolefin with at least one cyclic conjugated multiolefin. Generally, where more than one multiolefin is used, one is acyclic and the other is a cyclic multiolefin, e.g., isoprene/cyclopentadiene, although all the multiolefins may be cyclic. Non-limiting examples of acyclic multiolefins suitable for use in this invention are isoprene, piperylene, 2,3-dimethyl butadiene and 2,5-dimethyl hexadi, 2,4-ene.

The polymers prepared by the process of this invention comprise a major portion of isoolefin having about 5 to about 40 mole % unsaturation; more preferably about 6 to about 35 mole %, e.g., about 8 to about 30 mole %.

The prior art teaches that the copolymers produced by the process of this invention have a relatively high number average molecular weight and having properties which will make it widely acceptable on a commercial scale; see, for example, U.S. Pat. No. 3,808,177, incorporated herein by reference. The term "high number average molecular weight" as used in the specification and claims means the aforesaid range of $\overline{M}_n$ values.

In order to obtain number average molecular weights of at least 120,000 the polymerization reaction must be carried out below −100° C, preferably about −110° C, to about −140° C, more preferably −115° C to about −130° C, e.g., −120° C.

These low polymerization temperatures place certain restrictions on the solvents which may be used as the cosolvents of this invention. The term "cosolvent" as used in the specification and claims means the inert solvent which, together with the feed monomers, comprises the vehicle for the reaction. The cosolvent and monomers must be mutually soluble and the solution of monomers plus cosolvent must be a solvent for the copolymer formed at the polymerization temperature. The term "inert" means that the cosolvent will not react with the catalyst or otherwise enter into the polymerization reaction.

By the term poor solvent as used in the instant specification and claims, we mean a solvent which has difficulty maintaining homogeneity during the process of polymerization to make the polymers of the instant invention. Nonlimiting examples of such solvents are $C_4$-$C_8$ acyclic paraffins such as butane, pentane, hexane, heptane and octane. Preferred is hexane including hexane in its commercial form as defined herein. The term better solvents as used in the instant specification, means those solvents which when admixed with said poor solvents enables one to maintain homogeneity during the process of polymerization to make polymers of the instant invention. Nonlimiting examples of such better solvents are the $C_5$-$C_8$ cycloparaffins such as cyclopentane, methyl cyclopentane, cyclohexane, methyl cyclohexane, and dimethyl cyclohexane.

It will be obvious to those skilled in the art that the polymerization vehicle (cosolvent plus monomers) or cosolvent plus catalyst must not freeze at polymerization temperatures. Hence, for freezing point of the cosolvent is an important criterion for its selection. Similarly, the cosolvent should be readily separable from the polymer. This separation is facilitated if the cosolvent has a normal boiling point less than that of water.

Although some commercial elastomers such as styrene-butadiene rubber or EPDM may contain as much as 2 to 9 percent gel, isobutylene copolymers of commerce are substantially gel free. The term "substantially gel free" as used in the specification and claims means that the polymer contains 2% or less gel; preferably the polymer contains less than 1% gel.

For the purposes of this invention, it is convenient to define the volume percent cosolvent as that calculated based on the volume of monomers at the polymerization temperature while the volume of the cosolvent is determined at 25° C. The volume percent cosolvent as calculated is uncorrected for mixing volume changes and cooling of the cosolvent to reaction conditions.

The optimum amount of cosolvent to be used is the minimum amount necessary to avoid gellation. If too little is used, gellation of the product results. Too high a level of cosolvent results in an undesirable lowering of number average molecular weight. Within these bounds, the cosolvent level can be used to control $\overline{M}_n$ at a given temperature.

It will be evident to those skilled in the art that since the monomers act as part of the solvent system for the polymerization, the conversion level of the polymerization must not be so great as to result in precipitation of the polymer produced as a result of depletion of solvent. Preferably, the conversion level is about 2 to about 20%; more preferably about 3 to about 15%; most preferably about 5 to about 13%, e.g., 10%.

In the practice of this invention, the catalyst may be either the aluminum halide catalyst system disclosed in U.S. Pat. No. 3,808,177 or the hydrocarbyl aluminum dihalide catalyst of application Ser. No. 348,678, now U.S. Pat. No. 3,856,763, both incorporated herein by reference. Illustrative examples of the aluminum halides are $AlCl_3$ and $AlBr_3$. The preferred aluminum halide is $AlCl_3$. Where an aluminum halide catalyst is used, it must be dissolved in a polar solvent. The term "polar solvent" means nonaromatic, organic solvents having a dielectric constant at 25° C. of at least 4; preferably about 4 to about 20; more preferably about 6 to about 17; most preferably about 9 to about 13. Illustrative examples of these polar organic solvents are methyl chloride, ethyl chloride, propyl chloride, methyl bromide, ethyl bromide, chloroform, methylene chloride, etc.

The aluminum halide-polar solvent catalyst system preferably comprises about 0.01 to about 2 weight percent aluminum halide; more preferably about 0.05 to about 1; most preferably about 0.1 to about 0.8.

The hydrocarbyl aluminum dihalide catalyst suitable for use in this invention can have a hydrocarbyl group which is a $C_1$-$C_{18}$ straight chain, branched or cyclic group. Both cycloaliphatic and aromatic substituents can comprise the hydrocarbon radical. Alkyl groups, especially lower alkyl groups, e.g. $C_1$-$C_4$, are preferred because of their general availability and economy of use. The halide can be bromine or chlorine, preferably chlorine. The term "dihalide" as used in the specification and claims means dichloride or dibromide.

Illustrative examples of these hydrocarbyl aluminum dihalides are methylaluminum dichloride, ethylaluminum dichloride, isobutylaluminum dichloride, methylaluminum dibromide, ethylaluminum dichloride, benzylaluminum dichloride phenylaluminum dichloride, xylylaluminum dichloride, toluylaluminum dichloride, butylaluminum dichloride, hexylaluminum dichloride, octylaluminum dichloride, cyclohexylaminum dichloride, etc. The preferred catalysts are methylaluminum dichloride, ethylaluminum dichloride and isobutylaluminum dichloride.

The dihalide catalyst may be added to the reaction medium either neat or in solution. Preferably when a catalyst solvent is used, it is a liquid paraffin solvent, cycloparaffin solvent or solvent blend of the instant invention. It is advantageous though not necessary to use paraffins or blends of the instant invention of low freezing point. Methylcyclohexane is particularly useful since catalyst solutions of about 1% concentration do not freeze at −120° C. Also useful are the solvents and solvent blends of the present invention.

In carrying out the process of this invention, those skilled in the art will appreciate that only catalytic amounts of catalyst solution are required. Where the aluminum halide catalyst is used, the volume ratio of monomer plus cosolvent to catalyst solution is preferably about 100/1 to 9/1; more preferably about 80/1 to about 10/1; most preferably about 50/1 to about 20/1. Where the catalyst is a hydrocarbyl aluminum dihalide the volume ratio of monomers plus cosolvent to catalyst is about 1000/1 to about 9/1; more preferably about 250/1 to about 10/1; most preferably 200/1 to about 20/1.

The term "commercial hexane" as used in the specification and claims, means those hydrocarbon solvents consisting essentially of $C_6$ hydrocarbons and sold as commercial grade hexane. These solvents will have as constituents 2,3-dimethylbutane, 2-methylpentane, 3-methylpentane, n-hexane, and methylcyclopentane. Minor amounts of other $C_6$ hydrocarbons may be present. Benzene is sometimes present as an impurity. This constituent should not be present at more than about 0.2 wt. % as determined by VPC as it may interfere with the polymerization reaction. The n-hexane will generally be present in amounts ranging from about 35 wt. % to about 90 wt. %.

The compositions of useful commercial hexane are tabulated below:

| Constituent | Concentration[1] |
|---|---|
| Dimethylbutane | <2% |
| 2-methylpentane | about 2 to about 20% |
| 3-methylpentane | about 2 to about 20% |
| n-hexane | about 35 to about 90% |
| methylcyclopentane | about 5 to about 25% |
| benzene | <0.2% |

[1]wt.% as determined by Vapor Phase Chromatography

The "commercial hexane" of this invention has a normal boiling point of about 151° F. to about 158° F., well below that of water, making it easy to remove from prepared polymer.

In order to carry out a homogeneous preparation of a substantially gel-free isoolefin-cyclopentadiene copolymer using at least one $C_4$–$C_8$ acyclic paraffin, such as n-hexane or mixture of $C_6$ paraffins, such as commercial hexane, it is required that at least one $C_5$–$C_8$ cycloparaffin be used. The cosolvent should comprise about 15% by volume to about 90% by volume of the cycloparaffin preferably 25% by volume to 75% by volume, more preferably 25% by volume to 40% by volume.

The advantages of the instant invention may be more readily appreciated by reference to the following examples.

EXAMPLE 1

Various polymers were prepared from isobutylene using both cyclopentadiene and isoprene as the conjugated diolefins and commercial hexane as the cosolvent. All the polymerizations were carried out successfully using ethyl aluminum dichloride (EADC) as the catalyst at −115° C. A notable distinction between the isoprene polymerization and the cyclopentadiene polymerization was that in the case of isoprene, polymerization proceeded homogeneously. With cyclopentadiene, however, reaction resulted in a milky polymerization medium. It was possible to prepare isobutylene-isoprene copolymers at −120° C without gelation using as little as 20 volume % commercial hexane. The polymerization medium was viscous, yellow and clear. With a monomer composition comprising 15 volume % isoprene, a polymer was obtained having a number average molecular weight of 138,000. The conversion level was 5.9% based on the monomers. This example illustrates that solvents suitable for preparation of isoolefin-isoprene polymers are not necessarily suitable for isoolefin-cyclic multiolefin polymerizations.

EXAMPLE 2

The polymerization of Example 1 were repeated using as the cosolvent a blend of commercial hexane and cyclohexane comprising 25 volume % cyclohexane. At the 20% cosolvent level, the reaction medium was slightly cloudy but it did not have the milky appearance of the reactions of Example 1. At the 25 volume % cosolvent level, reactions were carried out at −120° C., and the reaction medium was clear, indicating that the polymerization was being carried out in a homogeneous fashion.

By increasing the volume % cyclohexane in the cosolvent from 25 to 40%, it was possible to carry out homogeneous polymerizations using as little as 20 volume % cosolvent. At 10 volume % cosolvent, where the cosolvent comprised 40% cyclohexane, heavy gel resulted.

FIG. 1 shows the effect of increasing cosolvent level on number average molecular weight wherein the polymerization is carried out at −120° C, the cosolvent is a 25/75 cyclohexane/commercial hexane mixture and the monomers are 95% isobutylene and 5% CPD. The number average molecular weight is found to be satisfactory in all cases. Table I shows a comparison of the result of varying the percent cyclohexane in the cosolvent and the volume % of cosolvent used.

Table I

| | POLYMERIZATION DATA FOR CYCLOHEXANE-COMMERCIAL HEXANE COSOLVENT SYSTEMS | | | | | | | |
|---|---|---|---|---|---|---|---|---|
| | | | (D-5; EADC Catalyst) | | | | | |
| Run | Cosolvent Cyclohexane/Hexane | Vol.% Cosolvent | Temp. °C | % Conversion | Cat,Eff. (g/g) | $\bar{M}_n \times 10^{-3}$ | Mole % CPD (Refr.Ind.) | Polymer Sol'n |
| 1 | 25/75 | 20 | −120 | 4.9 | 228 | 310 | 19.9 | Milky |
| 2 | 25/75 | 20 | −120 | 4.0 | 188 | 413 | 20.1 | Milky |
| 3 | 25/75 | 25 | −120 | 3.0 | 130 | 208 | — | Clear |
| 4 | 40/60 | 10 | −120 | 4.5 | 220 | Gel | — | Milky |
| 5 | 40/60 | 20 | −120 | 4.9 | 228 | 246 | — | Clear |
| 6 | 40/60 | 20 | −120 | 4.7 | 220 | 323 | 18.9 | Clear |
| 7 | 40/60 | 25 | −120 | 4.6 | 195 | 207 | 17.9 | Clear |
| 8 | 40/60 | 30 | −120 | 1.5 | 61 | 208 | — | Clear |

It is apparent that with 25% cyclohexane admixed with commercial hexane, homogeneous polymerizations may be carried out where the cosolvent level is at least 25 volume % of total feed. At the 40% cyclohexane level, only 20 volume % cosolvent is required to carry out homogeneous polymerizations.

Highly unsaturated copolymers of isobutylene with cyclopentadiene or isoprene, or terpolymers thereof, offer unique properties and potentials because of the high unsaturation levels. However, increased unsaturation in a polymer backbone also introduces unfavorable properties such as increased susceptibility to oxidative reactions, such as molecular weight degradation (isoprenoid unsaturation) or crosslinking (cycloolefin unsaturation) at elevated temperatures. These are believed to be free radical reactions. To protect against these reactions, free radical traps called antioxidants are added to the polymer.

Antioxidants may be broadly described as staining or non-staining. The former refers to the color change imparted to the polymer by the antioxidant as it is oxidized. Such a material is PBN (phenyl-2-naphthylamine). Nonstaining antioxidants inhibit oxidative reactions while imparting little or no coloration throughout the process. For some applications such as tire white walls, it is highly desirable to maintain network integrity with a minimum of staining.

The most common non-staining antioxidants are compounds containing a hindered phenolic structure. Typical of these structures are:

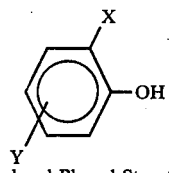

Hindered Phenol Structure where X at least is a bulky alkyl group such as t-butyl and Y may be alkyl group $o$, $m$, or $p$ to the —OH.

It has surprisingly been found that tetrakis [methylene 3-(3',5'-di-t-butyl-4'-hydroxyphenyl) propionate] methane, commercially known as and hereinafter referred to as Irganox 1010, is the most effective nonstaining antioxidant for the highly unsaturated coand terpolymers of the instant invention at elevated temperatures at from 0.4 to 1%. In comparative tests, Irganox 1010 performed better than other known hindered phenolic antioxidants which were tested at the same concentration level. A staining antioxidant, phenyl-2-naphthylamine (PBN) was also included in the test as a control.

EXAMPLE 4

A feed consisting of 80% monomers, 20% solvent and containing 5% cyclopentadiene on monomers was polymerized at −120° C. The resulting cement was warmed, treated with gaseous ammonia to deactivate acidic sites, and divided into 4 parts. The first part was poured into hot methanol saturated with PBN, and the coagulated polymer was dried in vacuo. The other three parts were treated with solutions of Ionol, Santowhite Crystals (SWC) and Irganox 1010 respectively. Each cement was steam flashed, the polymer was mill dried (290° F.; 4 min) and placed in an air oven at temperatures shown. Samples of each were taken at the intervals shown for inherent viscosity measurements. Data are summarized in Table II.

TABLE II

DEMONSTRATION OF ANTIOXIDANT ABILITY IN CPD-ISOBUTYLENE COPOLYMERS

| Hrs at 110° C | Inherent Viscosities | | | |
|---|---|---|---|---|
| | 1.30% Ionol | 1.15% SWC | 1.12% Irganox 1010 | PBN |
| 0 | 1.463 | 1.365 | 1.475 | 1.369 |
| 17 | Gel | 1.405 | 1.497 | 1.486 |
| 41 | — | Gel | 1.913 | 1.489 |
| 49 | — | — | 1.577 | 1.454 |
| 112 | — | — | 1.498 | Gel |
| 259 | — | — | 1.498 | — |
| Hrs at 150° C | | | | |
| 4 | Gel | Gel | 1.555 | 1.374 |
| 20 | — | — | 1.464 | Gel |
| 44 | — | — | 1.469 | — |

The procedure was repeated for an isoprene-isobutylene polymer (containing about 12% enchained isoprene) cement, and the results are summarized in Table IV.

TABLE III

DEMONSTRATION OF ANTIOXIDANT ABILITY IN ISOPRENE-ISOBUTYLENE COPOLYMERS

| Hrs at 110° C | Inherent Viscosities | | | |
|---|---|---|---|---|
| | 1.06% Ionol | 1.11% SWC | 1.14% Irganox 1010 | PBN |
| 0 | 1.130 | 0.976 | 1.268 | 1.286 |
| 17 | 1.199 | 1.140 | 1.293 | 1.219 |
| 41 | 1.328 | 1.021 | 1.211 | 0.981 |
| 65 | 0.872 | 0.962 | 1.154 | 1.217 |
| 164 | <0.5 | 0.859 | 1.145 | 1.005 |

| Hrs at 150° C | Inherent Viscosities | | | |
|---|---|---|---|---|
| | 1.06% Ionol | 1.11% SWC | 1.14% Irganox 1010 | PBN |
| 17 | <0.5 | <0.5 | 1.129 | <0.05 |
| 25 | — | — | 1.062 | |
| 49 | — | — | 0.905 | |
| 73 | — | — | 0.728 | |

It is evident from the above data that Irganox 1010 inhibits oxidative crosslinking in cyclopentadieneisobutylene polymers at elevated temperatures better than any of the other materials tried. It is also clear that it prevents oxidative molecular weight degradation in isoprene-isobutylene polymers at elevated temperatures for longer periods than do any of the others. See Table III.

It was also noted that SWC stabilized polymers were not white, but straw yellow, and darkened gradually to amber as gelation or molecular weight breakdown occurred. Irganox 1010 stabilized samples maintained their original white color throughout.

What is claimed is:

1. In a solution polymerization process for preparing a substantially gel-free, high number average molecular weight, high unsaturation copolymer of a $C_4$-$C_{10}$ isoolefin and at least one $C_5$-$C_9$ cyclic conjugated multiolefin wherein said copolymer contains about 5 to about 40 mole percent unsaturation and wherein the polymerization is performed by using as a catalyst a catalytic amount of either an aluminum halide dissolved in a polar solvent or a hydrocarbyl aluminum dihalide and wherein the polymerization is carried out at a temperature below −100° C., the improvement which comprises using a cosolvent in the amount of about 20 to about 40 volume percent based on the monomers plus cosolvent wherein the cosolvent comprises a blend of about 15 to about 90 volume percent of at least one $C_5$-$C_8$ cycloparaffin and about 85 to about 10 volume percent of at least one $C_4$–$C_8$ acyclic paraffin based on the total volume of cosolvent.

2. The process of claim 1 wherein the isoolefin is isobutylene.

3. The process of claim 1 wherein the multiolefin is cyclopentadiene.

4. The process of claim 1 wherein the polymer unsaturation is about 6 to about 35 mole %.

5. The process of claim 1 wherein the $\overline{M}_n$ is at least 120,000.

6. The process of claim 1 wherein the $C_5$–$C_8$ cycloparaffin is selected from the group consisting of cyclopentane, methyl cyclopentane, cyclohexane, methyl cyclohexane, and dimethyl cyclohexane.

7. The process of claim 1 wherein the $C_5$–$C_8$ cycloparaffin is cyclohexane.

8. The process of claim 1 wherein the $C_4$–$C_8$ acyclic paraffin is selected from the group consisting of butane, pentane, hexane, heptane and octane.

9. The process of claim 1 wherein the $C_4$–$C_8$ acyclic paraffin is commercial hexane.

10. The process of claim 1 wherein the cycloparaffin is used at about 25 to about 75 volume percent and the acyclic paraffin is used at about 75 to about 25 volume percent based on the total volume of cosolvent.

11. The process of claim 1 wherein the cycloparaffin is used at about 25 to about 40 volume percent and the acyclic paraffin is used at about 75 to about 60 volume percent based on the total volume of cosolvent.

12. In a solution polymerization process for preparing a substantially gel-free, high number average molecular weight, high unsaturation copolymer of a $C_4$–$C_{10}$ isoolefin, at least one $C_5$–$C_{14}$ acyclic conjugated diolefin and at least one $C_5$–$C_9$ cyclic conjugated multiolefin wherein said copolymer contains about 5 to about 40 mole percent unsaturation and wherein the polymerization is performed by using as a catalyst a catalytic amount of either an aluminum halide dissolved in a polar solvent or a hydrocarbyl aluminum dihalide and wherein the polymerization is carried out at a temperature below $-100°$ C., the improvement which comprises using a cosolvent in the amount of about 20 to about 40 volume percent based on the monomers plus cosolvent wherein the cosolvent comprises a blend of about 15 to about 90 volume percent of at least one $C_5$–$C_8$ cycloparaffin and about 85 to about 10 volume percent of at least one $C_4$–$C_8$ acyclic paraffin based on the total volume of cosolvent.

13. The process of claim 12 wherein the isoolefin is isobutylene.

14. The process of claim 12 wherein the acyclic conjugated diolefin is selected from the group consisting of isoprene, piperylene, 2,3-dimethyl butadiene and 2,5-dimethyl hexadi, 2,4-ene.

15. The process of claim 13 wherein the acyclic conjugated diolefin is isoprene.

16. The process of claim 12 wherein the cyclic conjugated multiolefin is selected from the group consisting of cyclopentadiene, methylcyclopentadiene, cyclohexadiene, and fulvene.

17. The process of claim 15 wherein the cyclic conjugated multiolefin is cyclopentadiene.

18. The process of claim 12 wherein the cyclic conjugated diolefin is cyclopentadiene.

19. The process of claim 12 wherein the polymer unsaturation is about 6 to about 35 mole %.

20. The process of claim 12 wherein the $\overline{M}_n$ is at least 120,000.

21. The process of claim 12 wherein the $C_5$–$C_8$ cycloparaffin is selected from the group consisting of cyclopentane, methyl cyclopentane, cyclohexane, methylcyclohexane, and dimethylcyclohexane.

22. The process of claim 12 wherein the $C_5$–$C_8$ cycloparaffin is cyclohexane.

23. The process of claim 12 wherein the $C_4$–$C_8$ acyclic paraffin is selected from the group consisting of butane, pentane, hexane, heptane and octane.

24. The process of claim 12 wherein the $C_4$–$C_8$ acyclic paraffin is commercial hexane.

25. In a solution polymerization process for preparing a substantially gel-free, high number average molecular weight, high unsaturation copolymer of a $C_4$–$C_{10}$ isoolefin and cyclopentadiene wherein said copolymer contains about 5 to 40 mole percent unsaturation and wherein the polymerization is carried out in a homogeneous phase using as a catalyst a catalytic amount of either an aluminum halide dissolved in a polar solvent or a hydrocarbyl aluminum dihalide and wherein the polymerization temperature is below $-100°$ C., the improvement which comprises using about 20 to about 40 volume % of cosolvent based on the cosolvent plus monomers wherein the cosolvent comprises about 15 to about 90 volume % of at least one $C_5$–$C_8$ cycloparaffin and about 85 to about 10 volume % of at least one $C_4$–$C_8$ acyclic paraffin based on the total volume of cosolvent.

26. The process of claim 25 wherein the cycloparaffin is used at about 25 to about 40 volume % and the acyclic paraffin is used at about 75 to about 60 volume % based on the total volume of cosolvent.

27. The process of claim 25 wherein the cycloparaffin is cyclohexane and the acyclic paraffin is commercial hexane.

28. The process of claim 25 wherein the isoolefin is isobutylene.

29. The process of claim 25 wherein the $C_5$–$C_8$ cycloparaffin is selected from the group consisting of cyclopentane, methylcyclopentane, methylcyclohexane and dimethylcyclohexane.

30. The process of claim 25 wherein the $C_5$–$C_8$ cycloparaffin is cyclohexane.

31. The process of claim 25 wherein the $C_4$–$C_8$ acyclic paraffin is selected from the group consisting of butane, pentane, heptane and octane.

32. The process of claim 25 wherein the $C_4$–$C_8$ acyclic paraffin is commercial hexane.

33. The process of claim 1 wherein the polar solvent is a halogenated aliphatic hydrocarbon.

34. The process of claim 12 wherein the polar solvent is a halogenated aliphatic hydrocarbon.

35. The process of claim 25 wherein the polar solvent is a halogenated aliphatic hydrocarbon.

36. The process of claim 33 wherein the halogenated hydrocarbon is a $C_1$ to $C_4$ chlorinated hydrocarbon.

37. The process of claim 34 wherein the halogenated hydrocarbon is a $C_1$ to $C_4$ chlorinated hydrocarbon.

38. The process of claim 35 wherein the halogenated hydrocarbon is a $C_1$ to $C_4$ chlorinated hydrocarbon.

39. The process of claim 1 wherein the aluminum halide is aluminum chloride.

40. The process of claim 12 wherein the aluminum halide is aluminum chloride.

41. The process of claim 25 wherein the aluminum halide is aluminum chloride.

42. The process of claim 1 wherein the polymerization temperature is about $-110°$ C. to $-135°$ C.

43. The process of claim 12 wherein the polymerization temperature is about −110° C. to −135° C.

44. The process of claim 25 wherein the polymerization temperature is about −110° C. to −135° C.

45. The process of claim 1 wherein the multiolefin is selected from the group consisting of cyclopentadiene, methylcyclopentadiene, cyclohexadiene, and fulvene.

46. The process of claim 1 wherein the hydrocarbyl aluminum dihalide is a hydrocarbyl aluminum dibromide or a dichloride.

47. The process of claim 12 wherein the hydrocarbyl aluminum dihalide is a hydrocarbyl aluminum dibromide or a dichloride.

48. The process of claim 25 wherein the hydrocarbyl aluminum dihalide is a hydrocarbyl aluminum dibromide or dichloride.

49. The process of claim 1 wherein the hydrocarbyl aluminum dihalide is selected from the group consisting of ethyl aluminum dichloride, isobutyl aluminum dichloride or methyl aluminum dichloride.

50. The process of claim 12 wherein the hydrocarbyl aluminum dihalide is selected from the group consisting of ethyl aluminum dichloride, isobutyl aluminum dichloride or methyl aluminum dichloride.

51. The process of claim 25 wherein the hydrocarbyl aluminum dihalide is selected from the group consisting of ethyl aluminum dichloride, isobutyl aluminum dichloride or methyl aluminum dichloride.

* * * * *